United States Patent
Wang et al.

(10) Patent No.: US 12,231,058 B2
(45) Date of Patent: Feb. 18, 2025

(54) POWER CONVERSION APPARATUS AND CONTROL METHOD FOR POWER CONVERSION APPARATUS

(71) Applicant: Huawei Digital Power Technologies Co., Ltd., Shenzhen (CN)

(72) Inventors: Congyuan Wang, Shanghai (CN); Kai Xin, Shanghai (CN); Zhangping Shao, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 138 days.

(21) Appl. No.: 18/147,168

(22) Filed: Dec. 28, 2022

(65) Prior Publication Data

US 2023/0208313 A1 Jun. 29, 2023

(30) Foreign Application Priority Data

Dec. 29, 2021 (CN) .......................... 202111633195.X (51) Int. Cl.
*H02M 7/48* (2007.01)
*H02M 1/00* (2006.01)
(Continued)

(52) U.S. Cl.
CPC ......... *H02M 7/483* (2013.01); *H02M 1/0009* (2021.05); *H02M 1/0019* (2021.05); *H02M 1/0845* (2013.01)

(58) Field of Classification Search
CPC ............. H02M 1/0009; H02M 1/0019; H02M 1/0845; H02M 7/483
See application file for complete search history.

(56) References Cited

U.S. PATENT DOCUMENTS

2020/0274456 A1* 8/2020 Tanaka ................ H02M 5/4585
2020/0412275 A1  12/2020 Virta et al.
2021/0249966 A1*  8/2021 Tobayashi ............. H02M 7/487

FOREIGN PATENT DOCUMENTS

CN        106921177 A     7/2017
CN        109755966 B     8/2020
(Continued)

OTHER PUBLICATIONS

Yang, "Converter and Control for Doubly Fed Induction Generator—Based Wind Power Generation", Hefei University of Technology, Oct. 2007, 338 pages.
(Continued)

*Primary Examiner* — Jue Zhang
*Assistant Examiner* — Lakaisha Jackson
(74) *Attorney, Agent, or Firm* — Maier & Maier, PLLC (57) ABSTRACT

A power conversion apparatus and a control method for a power conversion apparatus to reduce an amplitude of an output voltage of a converter when a grid is recovered from a fault, to ensure device safety. The power conversion apparatus includes a controller and a converter, and the controller is connected to the converter. The controller is configured to: after the output voltage of the converter is less than a first threshold, when the output voltage of the converter rises to be greater than a second threshold, reduce an active current output by the converter to a first current value, and reduce a reactive current output by the converter to a second current value, where the second threshold is greater than the first threshold.

14 Claims, 4 Drawing Sheets

(51) Int. Cl.
*H02M 1/084* (2006.01)
*H02M 7/483* (2007.01)

(56) References Cited

FOREIGN PATENT DOCUMENTS

| | | |
|---|---|---|
| CN | 111952982 A | 11/2020 |
| CN | 112152183 A | 12/2020 |
| EP | 3080888 B1 | 4/2020 |

OTHER PUBLICATIONS

Wang et al., "Study on Measure to Restrain Transient Over-Voltage in 35 kV PV-LVRT Experiment", China Academic Journal Electronic Publishing House, vol. 51, No. 10, Oct. 16, 2015, 5 pages.

\* cited by examiner

POWER CONVERSION APPARATUS AND CONTROL METHOD FOR POWER CONVERSION APPARATUS

CROSS-REFERENCE TO RELATED APPLICATION

This application claims priority to Chinese Patent Application No. 202111633195.X, filed on Dec. 29, 2021, which is hereby incorporated by reference in its entirety.

TECHNICAL FIELD

The embodiments relate to the field of converter technologies, a power conversion apparatus, and a control method for a power conversion apparatus.

BACKGROUND

Photovoltaic power generation is widely used as clean renewable energy. A photovoltaic power generation system can convert light energy into electric energy and output the electric energy to a grid. Generally, a converter in the photovoltaic power generation system is connected to a grid-connected transformer. The grid-connected transformer converts a voltage output by the converter into a grid voltage, and outputs the voltage to the grid.

When the grid is faulty, the grid voltage decreases. In this case, the converter needs to inject a reactive current into the grid to support voltage recovery of the grid. When a transmission impedance between the grid and the converter is large or a proportion of non-synchronous energy included in the grid is high, an output voltage of the converter has a weak grid characteristic. In this scenario, if the grid has a short-circuit fault, the converter injects a specified reactive current and a specified active current into the grid. When the grid is recovered from a fault, although the grid voltage has been recovered to a normal value, due to a detection delay, a control delay, a phase-locked dynamic process, and the like of the converter, the converter still injects the reactive current and the active current into the grid for a time period. The current may increase voltage amplitudes at two terminals of the transmission impedance, and also increase the output voltage of the converter. The large voltage may cause damage to some devices and affect normal working of the device.

Currently, a snubber circuit is mostly disposed between the converter and the grid to weaken an output current of the converter, to reduce an amplitude of the output voltage of the converter. However, in the manner of disposing the snubber circuit, a new device needs to be added to a current architecture. This increases system costs.

SUMMARY

The embodiments may provide a power conversion apparatus and a control method for a power conversion apparatus, to reduce an amplitude of an output voltage of the power conversion apparatus when a grid is recovered from a fault, to ensure device safety.

According to a first aspect, the embodiments may provide a power conversion apparatus, where the power conversion apparatus may be separately connected to a new energy power generation system and a grid, and implement a grid connection of the new energy power generation system. The power conversion apparatus may include a controller and a converter, and the controller is connected to the converter.

The controller may be configured to detect an output voltage of the converter. The controller is configured to: after the output voltage of the converter is less than a first threshold, when the output voltage of the converter rises to be greater than a second threshold, reduce an active current output by the converter to a first current value, and reduce a reactive current output by the converter to a second current value, where the second threshold is greater than the first threshold; and adjust, based on a preset current adjustment rate, the reactive current and the active current that are output by the converter until the active current is adjusted from the first current value to a target active current value and the reactive current is adjusted from the second current value to a target reactive current value. The target reactive current value falls within a reactive current value range output when the converter works normally, the target active current value falls within an active current value range output when the converter works normally, and the first current value and the second current value are respectively any value less than 50% of the reactive current value range output when the converter works normally and any value less than 50% of the active current value range output when the converter works normally.

In the foregoing power conversion apparatus, when it is detected that the output voltage of the converter is less than the first threshold, it may be determined that the grid connected to the power conversion apparatus is faulty. To support recovery of the grid, the converter outputs a large current. The output voltage of the converter continues to be detected. When it is detected that the output voltage of the converter rises to be greater than the second threshold, it is determined that the grid is recovered from a fault, and the reactive current and the active current that are output by the converter are controlled to respectively drop to the first current value and the second current value. Therefore, the large current output by the converter is prevented from increasing an amplitude of a current that flows through a transmission impedance, to reduce an amplitude of the output voltage of the converter. Because an amplitude of an output current and the amplitude of the output voltage of the converter are reduced, it is ensured that the converter and a device connected to the converter are safe.

In a possible implementation, the first current value and the second current value are greater than 0 and less than or equal to 10% of an active current value and a reactive current value that are output when the converter works normally.

In the foregoing power conversion apparatus, if amplitudes of the first current value and the second current value are lower, a total output current of the converter is smaller, and the amplitude of the current of the transmission impedance is correspondingly lower, to rapidly reduce the output voltage of the converter.

In a possible implementation, the controller is configured to adjust, based on different current adjustment rates, the reactive current or the active current output by the converter until the active current value is adjusted from the first current value to the target active current value and the reactive current is adjusted from the second current value to the target reactive current value.

In the foregoing power conversion apparatus, a current adjustment rate of the active current or the reactive current output by the converter may be controlled by using a working requirement of the converter, to meet a requirement of the converter on the output voltage and the output current.

In a possible implementation, the controller is configured to adjust, in a plurality of adjustment stages, the reactive current or the active current output by the converter, where current adjustment rates of all adjustment stages in the plurality of adjustment stages are different, or a current adjustment rate of at least one adjustment stage in the plurality of adjustment stages is different from a current adjustment rate of another adjustment stage, and the another adjustment stage is an adjustment stage other than the at least one adjustment stage in the plurality of adjustment stages.

In a possible implementation, the controller is configured to adjust, based on a same current adjustment rate, the reactive current or the active current output by the converter until the active current value is adjusted from the first current value to the target active current value and the reactive current is adjusted from the second current value to the target reactive current value.

In a possible implementation, when the output voltage of the converter is less than the first threshold, low voltage ride through occurs in the converter.

In the foregoing power conversion apparatus, when the grid connected to the power conversion apparatus is faulty, the output voltage of the converter drops, and low voltage ride through occurs. Therefore, a low voltage ride through value existing when low voltage ride through occurs in the converter may be used as the first threshold.

In a possible implementation, the second threshold is less than or equal to a minimum voltage value output when the converter works normally.

In the foregoing power conversion apparatus, when the grid is recovered from the fault, the output voltage of the converter rises rapidly, and the output voltage of the converter is suppressed by reducing the output current of the converter. Therefore, a moment at which the output voltage of the converter is less than the minimum voltage value output when the converter works normally may be used as a fault recovery moment of the grid, to control the output current of the converter in advance and reduce the amplitude of the output voltage of the converter 402.

According to a second aspect, the embodiments may provide a control method for a power conversion apparatus, where the control method may be applied to a power conversion apparatus, and the power conversion apparatus includes a controller and a converter. The control method may include the following steps: detecting an output voltage of the converter; after the output voltage of the converter is less than a first threshold, when the output voltage of the converter rises to be greater than a second threshold, reducing an active current output by the converter to a first current value, and reducing a reactive current output by the converter to a second current value, where the second threshold is greater than the first threshold; and adjusting, based on a preset current adjustment rate, the reactive current and the active current that are output by the converter until the active current is adjusted from the first current value to a target active current value and the reactive current is adjusted from the second current value to a target reactive current value, where the target reactive current value falls within a reactive current range output when the converter works normally, the target active current value falls within an active current range output when the converter works normally, and the first current value and the second current value are respectively any value less than 50% of the reactive current value range output when the converter works normally and any value less than 50% of the active current value range output when the converter works normally.

In the foregoing control method, when it is detected that the output voltage of the converter is less than the first threshold, it may be determined that a grid connected to the power conversion apparatus is faulty. To support recovery of the grid, the converter outputs a large current. The output voltage of the converter continues to be detected. When it is detected that the output voltage of the converter rises to be greater than the second threshold, it is determined that the grid is recovered from a fault, and the reactive current and the active current that are output by the converter are controlled to respectively drop to the first current value and the second current value. Therefore, the large current output by the converter is prevented from increasing an amplitude of a current that flows through a transmission impedance, to reduce an amplitude of the output voltage of the converter. Because an amplitude of an output current and the amplitude of the output voltage of the converter are reduced, it is ensured that the converter and a device connected to the converter are safe.

In a possible implementation, the first current value and the second current value are greater than 0 and less than or equal to 10% of an active current value and a reactive current value that are output when the converter works normally.

In the foregoing method, if amplitudes of the first current value and the second current value are lower, a total output current of the converter is smaller, and the amplitude of the current of the transmission impedance is correspondingly lower, to rapidly reduce the output voltage of the converter.

In a possible implementation, the adjusting, based on a preset current adjustment rate, the reactive current and the active current that are output by the converter until the active current is adjusted from the first current value to a target active current value and the reactive current is adjusted from the second current value to a target reactive current value includes: adjusting, based on different current adjustment rates, the reactive current or the active current output by the converter until the active current value is adjusted from the first current value to the target active current value and the reactive current is adjusted from the second current value to the target reactive current value.

In the foregoing method, a current adjustment rate of the active current or the reactive current output by the converter may be controlled by using a working requirement of the converter, to meet a requirement of the converter on the output voltage and the output current.

In a possible implementation, the adjusting, based on different current adjustment rates, the reactive current or the active current output by the converter includes: adjusting, in a plurality of adjustment stages, the reactive current or the active current output by the converter, where current adjustment rates of all adjustment stages in the plurality of adjustment stages are different, or a current adjustment rate of at least one adjustment stage in the plurality of adjustment stages is different from a current adjustment rate of another adjustment stage, and the another adjustment stage is an adjustment stage other than the at least one adjustment stage in the plurality of adjustment stages.

In a possible implementation, the adjusting, based on a preset current adjustment rate, the reactive current and the active current that are output by the converter until the active current is adjusted from the first current value to a target active current value and the reactive current is adjusted from the second current value to a target reactive current value includes: adjusting, based on a same current adjustment rate, the reactive current or the active current output by the converter until the active current value is adjusted from the reactive current is adjusted from the second current value to the target reactive current value.

In a possible implementation, when the output voltage of the converter is less than the first threshold, low voltage ride through occurs in the converter.

In the foregoing method, when the grid connected to the power conversion apparatus is faulty, the output voltage of the converter drops, and low voltage ride through occurs. Therefore, a low voltage ride through value existing when low voltage ride through occurs in the converter may be used as the first threshold.

In a possible implementation, the second threshold is less than a minimum voltage output when the converter works normally.

In the foregoing method, when the grid is recovered from the fault, the output voltage of the converter rises rapidly, and the output voltage of the converter is suppressed by reducing the output current of the converter. Therefore, a moment at which the output voltage of the converter is less than the minimum voltage value output when the converter works normally may be used as a fault recovery moment of the grid, to control the output current of the converter in advance and reduce the amplitude of the output voltage of the converter.

DETAILED DESCRIPTION THE OF EMBODIMENTS

The following describes in detail the embodiments with reference to accompanying drawings.

An operation method in a method embodiment may also be applied to an apparatus embodiment or a system embodiment. It should be noted that "a plurality of" merely means "two or more.". The term "and/or" describes an association relationship for describing associated objects and represents that three relationships may exist. For example, A and/or B may represent the following three cases: only A exists, both A and B exist, and only B exists. In addition, the character "/" generally indicates an "or" relationship between the associated objects. In addition, it should be understood that terms such as "first" and "second" are merely used for distinguishing and description but should not be understood as indicating or implying relative importance, or should not be understood as indicating or implying a sequence.

It should be noted that in the embodiments, the "connection" may be an electrical connection, or may be a communication connection. An electrical connection between two electrical elements may be a direct or indirect connection between the two electrical elements. For example, a connection between A and B may be a direct connection between A and B or may be an indirect connection between A and B by using one or more other electrical elements. For example, a connection between A and B may be a direct connection between A and C, a direct connection between C and B, or a connection between A and B by using C.

It should be noted that a switch in the embodiments may be one or more of a plurality of switch devices such as a relay, a metal-oxide semiconductor field-effect transistor (MOSFET), a bipolar junction transistor (BJT), an insulated gate bipolar transistor (IGBT), a gallium nitride (GaN) field-effect transistor, and a silicon carbide (SiC) power transistor. The switch devices are not listed one by one in the embodiments. Each switch device may include a first electrode, a second electrode, and a control electrode. The control electrode is used to control the switch device to be turned on or turned off. When the switch device is turned on, a current may be transmitted between the first electrode and the second electrode of the switch device. When the switch device is turned off, a current cannot be transmitted between the first electrode and the second electrode of the switch device. The MOSFET is used as an example. The control electrode of the switch device is a gate. The first electrode of the switch device may be a source of the switch device, and the second electrode may be a drain of the switch device. Alternatively, the first electrode may be a drain of the switch device, and the second electrode may be a source of the switch device.

Figure 1:
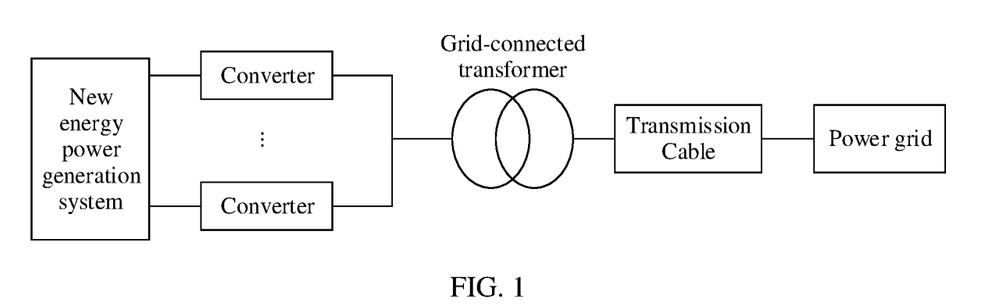
FIG. 1 is a schematic diagram of a grid connection of a new energy power generation system according to an embodiment.

With the development of new energy, a proportion of electric energy generated by a new energy power generation system is increasingly high in a grid. The electric energy generated by the new energy power generation system may be transmitted to the grid by using a grid-connected device. FIG. 1 is a schematic diagram of a grid connection of a new energy power generation system. The new energy power generation system is sequentially connected to a converter, a grid-connected transformer, and a grid. The converter may convert a direct current generated by the new energy power generation system into an alternating current and output the alternating current to the grid-connected transformer. The grid-connected transformer may perform voltage regulation processing on the alternating current output by the converter, and then output, to the grid by using a transmission line, the alternating current on which voltage regulation is performed. It should be noted that the grid-connected transformer may further implement electrical isolation between the new energy power generation system and the grid.

It should be understood that the new energy power generation system may be, but is not limited to, a photovoltaic power generation system, a wind power generation system, or a hydro power generation system.

A first impedance exists on the transmission line between the grid-connected transformer and the grid, and a second impedance exists on the grid-connected transformer. A third impedance that is a sum of the first impedance and the second impedance represents a transmission impedance between the converter and the grid.

Figure 2:
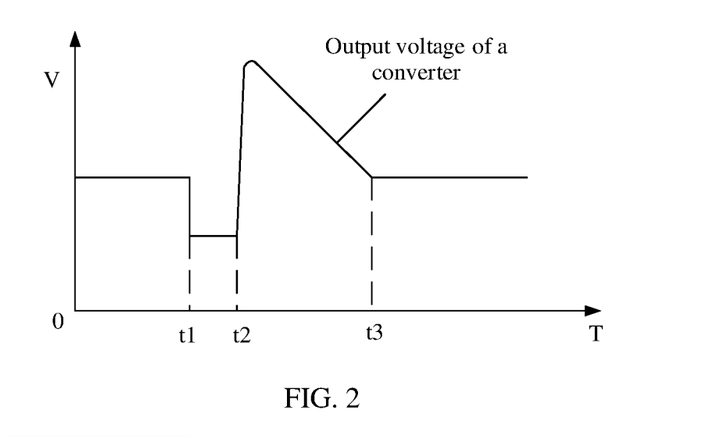
FIG. 2 is a schematic diagram of a waveform of an output voltage of a converter according to an embodiment.

In actual use, refer to FIG. 2. In a process of transmitting electric energy generated by the new energy power generation system to the grid, if the grid is faulty at a moment t1, for example, has a short-circuit fault, the converter injects a reactive current into the grid to support voltage recovery of the grid. When the grid is recovered from a fault at a moment t2, a voltage of the grid is recovered to a normal value. However, due to a detection delay, a control delay, a phase-locked dynamic process, and the like of the converter, the converter still injects the reactive current and an active current into the grid for a time period. The current is superposed with a current generated by an inductive impedance during freewheeling and passes through the transmission impedance. Consequently, an amplitude of a current that flows through the transmission impedance increases. In this case, the current needs to be delayed to a moment t3 to be recovered to a normal value, and an output voltage of the converter in the time period is a sum of the voltage of the grid and a voltage generated when the current flows through the transmission impedance. An output terminal of the converter is in a high-voltage state. Before the current that flows through the transmission impedance is recovered to a normal current, the converter and the new energy power generation system connected to the converter may be damaged by carrying a large voltage.

It should be noted that, when the grid is faulty, the output voltage of the converter drops, and low voltage ride through occurs in the converter. In this case, the output voltage of the converter is less than a low voltage ride through threshold. To maintain a connection between the converter and the grid, the converter needs to output a large current to perform current compensation. After the grid is recovered from a fault, because an output current of the converter is superposed with the freewheeling current of the inductive impedance, a voltage of an output port of the converter rises greatly, and the output voltage of the converter is greater than or equal to a high voltage ride through threshold. When the grid runs normally, the converter is in a normal state. In this case, the reactive current output by the converter is a target reactive current value, and the active current output by the converter is a target active current value.

Figure 3:
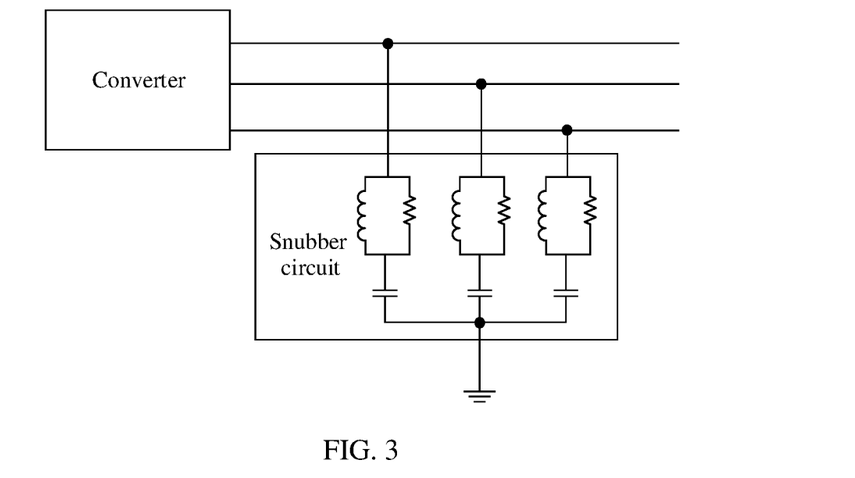
FIG. 3 is a schematic diagram of a structure of a snubber circuit according to an embodiment.

To eliminate a problem that the converter outputs a large current and a large voltage, currently, a snubber circuit is mostly disposed on the output terminal of the converter. FIG. 3 is a schematic diagram of a possible structure of a snubber circuit. The snubber circuit includes a filter device such as a filter capacitor and a filter inductor. The filter device may filter out a high-frequency signal on the transmission line, to eliminate peak values of an alternating current voltage and an alternating current, so as to suppress amplitudes of the output voltage and the output current of the converter. However, in this manner in which the current and voltage are suppressed, an additional device needs to be added to a grid-connected architecture of the new energy power generation system. This increases grid-connected costs of the new energy power generation system.

In view of this, the embodiments may provide a power conversion apparatus and a control method for a power conversion apparatus, to reduce an amplitude of an output voltage of a converter when a grid is recovered from a fault, to ensure device safety.

Figure 4:
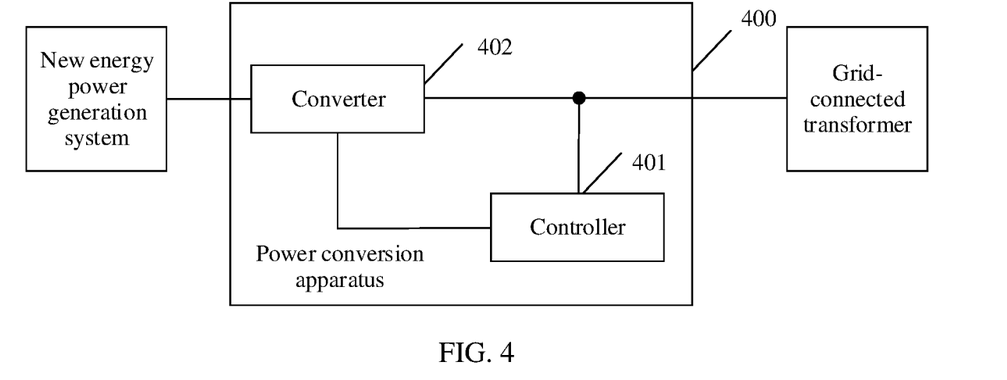
FIG. 4 is a first schematic diagram of a structure of a power conversion apparatus according to an embodiment.

FIG. 4 shows a power conversion apparatus according to an embodiment. A power conversion apparatus 400 is separately connected to a grid-connected inverter and a new energy power generation system and is configured to output electric energy of the new energy power generation system to a grid connected to the grid-connected inverter, to implement a grid connection of the new energy power generation system. The power conversion apparatus 400 may include a controller 401 and a converter 402.

The controller 401 is connected to the converter 402. The controller 401 is configured to detect an output voltage of the converter 402. The controller 401 is configured to: after the output voltage of the converter 402 is less than a first threshold, when the output voltage of the converter 402 rises to be greater than a second threshold, reduce an active current output by the converter 402 to a first current value, and reduce a reactive current output by the converter 402 to a second current value; and adjust, based on a preset current adjustment rate, the reactive current and the active current that are output by the converter 402 until the active current is adjusted from the first current value to a target active current value and the reactive current is adjusted from the second current value to a target reactive current value.

The target reactive current value falls within a reactive current value range output when the converter 402 works normally, the target active current value falls within an active current value range output when the converter works normally, the second threshold is greater than the first threshold, and the first current value and the second current value are respectively any value less than 50% of the reactive current value range output when the converter works normally and any value less than 50% of the active current value range output when the converter works normally.

It should be noted that, when the grid is faulty, the output voltage of the converter 402 drops, and low voltage ride through occurs. Therefore, the controller 401 may use a low voltage ride through value of the converter 402 as the first threshold, that is, when detecting that the output voltage of the converter 402 is less than the first threshold, the controller 401 may determine that the grid is faulty and low voltage ride through occurs in the converter 402.

It should be noted that, when the grid is recovered from a fault, the output voltage of the converter 402 rises rapidly due to a freewheeling current of an inductive impedance and a large current output by the converter 402. To determine a fault recovery moment of the grid as soon as possible, and suppress the output voltage of the converter 402, the second threshold used to control an output current adjustment moment of the converter 402 may be set to be greater than the first threshold and less than or equal to a minimum voltage value output when the converter 402 works normally. Because the second threshold is less than the minimum voltage value output when the converter 402 works normally, before the output voltage of the converter 402 rises substantially, the controller 401 may adjust an output current of the converter in an initial stage of fault recovery of the grid, to suppress the output voltage of the converter 402.

It should be understood that, because the second threshold is less than the minimum voltage value output when the converter 402 works normally, before the output voltage of the converter 402 rises substantially, the controller 401 may control the output current of the converter 402 to drop, to increase an amplitude of the output voltage of the converter 402.

In the power conversion apparatus 400, after the output voltage of the converter 402 is less than the first threshold, the controller 401 may determine that the grid is faulty and low voltage ride through occurs in the converter 402. When it is detected that the output voltage of the converter 402 rises to be greater than the second threshold, the controller 401 may determine that the grid is recovered from the fault. To prevent the large current output by the converter 402 from increasing an amplitude of a current that flows through a transmission impedance, the active current output by the converter 402 may be reduced to the first current value, and the reactive current output by the converter 402 may be reduced to the second current value, to reduce the amplitude of the current that flows through the transmission impedance between the grid and the converter 402. When the amplitude of the current that flows through the transmission impedance is reduced, a voltage difference between two terminals of the transmission impedance is reduced, and the amplitude of the output voltage of the converter 402 is reduced, to ensure that the power conversion apparatus 400 and a device connected to the power conversion apparatus 400 are safe. Then, the active current value and the reactive current value that are output by the converter 402 are gradually adjusted until the active current value and the reactive current value are recovered to the target active current value and the target reactive current value that are output when the converter 402 works normally. During output current adjustment of the converter 402, electric energy stored on the inductive impedance is gradually consumed, and the amplitude of the current of the transmission impedance is gradually reduced. Therefore, when the output current of the converter 402 is recovered to the target active current value and the target reactive current value, the output voltage of the converter 402 may be recovered to an output voltage existing when the converter 402 works normally, and the converter 402 may work normally.

It should be understood that, when the controller 401 reduces the active current output by the converter 402 to the first current value and reduces the reactive current output by the converter 402 to the second threshold, a current value of a total output current of the converter 402 is less than a current value transmitted on the grid. This may accelerate a speed of consuming the electric energy stored on the inductive impedance, and accelerate a speed at which voltage amplitudes at the two terminals of the transmission impedance drop, so that the output voltage of the converter can be rapidly recovered to the output voltage existing when the converter 402 works normally, to ensure that the converter 402 and the device connected to the converter 402 are safe.

It should be understood that, when it is determined that the grid is recovered from the fault, the active current output by the converter 402 is reduced to the first current value, and the reactive current output by the converter 402 is reduced to the second current value. Smaller amplitudes of the first current value and the second current value indicate a smaller amplitude of the total output current of the converter 402, a smaller amplitude of the current that flows through the transmission impedance, and a smaller amplitude of the output voltage of the converter 402.

Optionally, to reduce the amplitude of the output voltage of the converter 402, the first current value and the second current value are greater than 0 and less than or equal to 10% of an active current value and a reactive current value that are output when the converter works normally.

To implement a maximum suppression effect on the output voltage of the converter 402, a value near zero may be used as the first current value and the second current value.

In actual application, the power conversion apparatus 400 may be fastened to the new energy power generation system. In another implementation, the power conversion apparatus 400 may be disposed in a flexible and detachable form, that is, a fixed interface is disposed on the power conversion apparatus 400, to implement a connection between the power conversion apparatus 400 and the new energy power generation system, and a connection between the power conversion apparatus 400 and a grid-connected transformer. In this case, the power conversion apparatus 400 may be considered as an apparatus independent of the new energy power generation system.

In a possible implementation, the new energy power generation system may further supply power to the power conversion apparatus 400.

It should be understood that, if the new energy power generation system directly supplies power to the controller 401 and the converter 402 in the power conversion apparatus 400, it may be difficult for a voltage output by the new energy power generation system to meet requirements of the controller 401 and the converter 402 on a power supply voltage. Therefore, a voltage converter may further be connected between the new energy power generation system and the power conversion apparatus 400. The voltage converter performs voltage regulation processing on the voltage output by the new energy power generation system, to output a power supply voltage available to the controller 401 and the converter 402.

Figure 5:
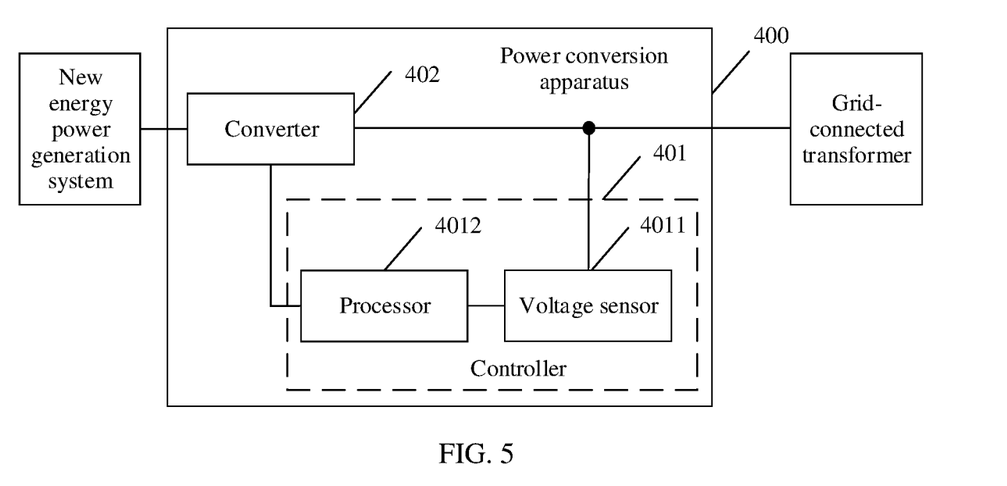
FIG. 5 is a second schematic diagram of a structure of a power conversion apparatus according to an embodiment.

FIG. 5 is a schematic diagram of a structure of a power conversion apparatus 400 according to an embodiment. The power conversion apparatus 400 may include a controller 401 and a converter 402. The controller 401 may include a voltage sensor 4011 and a processor 4012.

The voltage sensor 4011 in the controller 401 is a device for detecting an output voltage of the converter 402. The voltage sensor 4011 is separately connected to an output terminal of the converter 402 and the processor 4012 and is configured to: detect the output voltage of the converter 402 and output the detected voltage to the processor 4012.

In an example, when the output terminal of the converter 402 outputs a three-phase alternating current, an input terminal of the voltage sensor 4011 may be a three-phase alternating current terminal, and the three-phase alternating current terminal is separately connected to three phase wires that are of the output terminal of the converter 402 and that are used to output a three-phase alternating current. The voltage sensor 4011 receives, by using the three-phase alternating current terminal, an amplitude of the three-phase alternating current output by the output terminal of the converter 402, to detect the output voltage of the converter 402.

In another example, when the output terminal of the converter outputs a three-phase alternating current, an input terminal of the voltage sensor 4011 may be three single-phase alternating current terminals, and each single-phase alternating current terminal is connected to one phase wire of the converter 402. The voltage sensor 4011 receives a voltage of each phase wire of the converter 402 by using the three single-phase input terminals, to obtain an amplitude of the three-phase alternating current output by the output terminal of the converter 402, so as to detect the output voltage of the converter 402.

In a possible implementation, when detecting the three-phase alternating current output by the converter, the voltage sensor 4011 may use a voltage value of one phase of alternating current in the three-phase alternating current as the output voltage of the converter 402 and output the output voltage of the converter 402 to the processor 4012.

In an example, to reduce detection costs of the voltage sensor 4011, the voltage sensor 4011 may directly detect an alternating current transmitted on one of the phase lines of the output terminal of the converter 402, use the detected alternating current as the output voltage of the converter 402, and output the output voltage to the processor 4012. No voltage detection is performed on the other two phase lines of the output terminal of the converter 402.

In another example, to ensure detection accuracy of the converter 402, when detecting the three-phase alternating current output by the converter, the voltage sensor 4011 may use an average value of the three-phase alternating current as the output voltage of the converter 402 and output the output voltage of the converter 402 to the processor 4012.

In actual use, the voltage sensor 4011 may use an existing structure such as a Hall sensor. A voltage detection terminal of the Hall sensor is connected to the output terminal of the converter 402, and a signal output terminal of the Hall sensor is connected to the processor 4012.

It should be noted that an amplitude of the three-phase alternating current output by the output terminal of the converter 402 is high, and a higher amplitude of a voltage detected by the voltage sensor 4011 indicates larger costs of the voltage sensor 4011 and the processor 4012 configured to process the voltage detected by the voltage sensor 4011. To reduce costs of the controller 401, a step-down module may be further connected between the voltage sensor 4011 and the output terminal of the converter 402. A first end of the step-down module is connected to the output terminal of the converter 402, and a second end of the step-down module is connected to the voltage sensor 4011. The step-down module may perform step-down processing on the output voltage of the converter 402, and output, to the voltage sensor 4011 for detection, a voltage obtained after step-down processing is performed. The step-down module may use an existing step-down device such as a resistor or a step-down circuit. This is not limited herein.

It should be noted that, because the step-down module performs proportional step-down processing on the output voltage of the converter 402, when subsequently receiving the output voltage of the converter 402 output by the voltage sensor 4011, the processor 4012 needs to perform proportional recovery on the voltage output by the voltage sensor 4011, to obtain the output voltage value of the converter 402.

The processor 4012 is a device that controls an output current of the converter 402. A first end of the processor 4012 is connected to the voltage sensor 4011, and a second end of the processor 4012 is connected to the converter 402. After the output voltage of the converter 402 is less than a first threshold, the processor 4012 determines that a grid is faulty. When the output voltage of the converter 402 rises to be greater than a second threshold, it is determined that the grid is recovered from a fault. To prevent a large current output by the converter 402 from increasing an amplitude of a current that flows through a transmission impedance, an active current output by the converter 402 is reduced to a first current value, a reactive current output by the converter 402 is reduced to a second current value, and the reactive current and the active current that are output by the converter are adjusted based on a preset current adjustment rate until the active current is adjusted from the first current value to a target active current value and the reactive current is adjusted from the second current value to a target reactive current value.

It should be understood that, because the processor 4012 reduces the output current of the converter 402 when the grid is recovered from the fault, the amplitude of the current that flows through the transmission impedance is reduced, to reduce an amplitude of the output voltage of the converter 402. In addition, when the active current output by the converter 402 is the first current value and the reactive current output by the converter 402 is the second current value, a total output current value of the converter is less than the current value of the transmission impedance. This may accelerate a drop speed of a current of the grid. A time period in which the output voltage of the converter 402 is recovered to an output voltage value existing when the converter 402 works normally is less than a time interval between t2 and t3 in FIG. 2.

In actual use, the converter 402 may include a device such as a switching transistor, a diode, an inductor, and a capacitor. A working state of the converter may be implemented by adjusting a working state of the device (for example, the switching transistor).

The working state of the foregoing device may be adjusted by using the processor 4012.

In actual use, the processor 4012 may be connected to a control electrode of a switch in the connected converter 402 and control a turn-on moment and turn-on duration of the switching transistor by providing a drive signal for the switch in the converter 402, to adjust the working state of the converter 402, and adjust the output current of the converter 402.

If the switch in the converter 402 is a MOS, the processor 4012 may be connected to a gate of the MOS transistor, to adjust the output current of the converter 402 by controlling turn-on/turn-off of the MOS transistor. If the switch in the converter 402 is BJT, the processor may be connected to a base of the BJT, to adjust the output current of the converter 402 by controlling turn-on/turn-off of the BJT.

In implementation, the processor 4012 may be any one of a micro control unit (MCU), a central processing unit (CPU), a field programmable gate array (FPGA), and a digital signal processor (DSP). A form of the processor 4012 is not limited to the foregoing example.

In actual use, the processor 4012 may adjust the output current of the converter 402 in a plurality of manners. The following describes in detail a manner in which the processor 4012 adjusts the output current of the converter.

In a possible implementation, when the output voltage of the converter 402 rises to be greater than the second threshold, the processor 4012 in the controller 401 adjusts, based on different current adjustment rates, the reactive current or the active current output by the converter until the active current value is adjusted from the first current value to the target active current value and the reactive current value is adjusted from the second current value to the target reactive current value.

In implementation, the reactive current or the active current output by the converter is adjusted in a plurality of adjustment stages.

Optionally, current adjustment rates of all adjustment stages in the plurality of adjustment stages are different.

It should be understood that, when current adjustment rates of all adjustment stages in the plurality of adjustment stages are different, current differences between every two adjacent moments in each adjustment stage are different.

Optionally, a current adjustment rate of at least one adjustment stage in the plurality of adjustment stages is different from a current adjustment rate of another adjustment stage, and the another adjustment stage is an adjustment stage other than the at least one adjustment stage in the plurality of adjustment stages.

It should be understood that, when current adjustment rates corresponding to the plurality of adjustment stages are set, if the adjustment rates corresponding to the adjustment stages are different, output current adjustment time periods of the converter 402 are different. This may be set based on a working requirement of the converter 402. For example, a withstand voltage of the converter 402 is small, the output voltage of the converter 402 needs to be reduced as soon as possible to the output voltage existing when the converter 402 works normally. In this case, a current adjustment rate of an initial adjustment stage in the plurality of adjustment stages may be increased, so that the output voltage of the converter 402 can be reduced rapidly. For another example, a plurality of precision devices may be connected to the converter 402, and the output voltage of the converter 402 cannot be reduced rapidly. In this case, the current adjustment rates of the plurality of adjustment stages may be reduced, so that the output voltage of the converter 402 can be slowly reduced to the output voltage existing when the converter 402 works normally.

In another possible implementation, when the output voltage of the converter 402 rises to be greater than the second threshold, the processor 4012 in the controller 401 adjusts, based on a same current adjustment rate, the reactive current or the active current output by the converter until the active current value is adjusted from the first current value to the target active current value and the reactive current value is adjusted from the second current value to the target reactive current value.

It should be understood that, when the processor 4012 adjusts, based on a same current adjustment rate, the reactive current or the active current output by the converter, the active current or the reactive current output by the converter 402 may be changed in a balanced manner.

It should be noted that, in a plurality of solutions in which the processor 4012 adjusts, based on the current adjustment rate, the active current and the reactive current that are output by the converter 402, the amplitude of the output voltage of the converter 402 may be reduced, and a speed at which the output current of the converter 402 is recovered to a normal value may be accelerated. A difference is that current adjustment duration is different.

Figure 6:
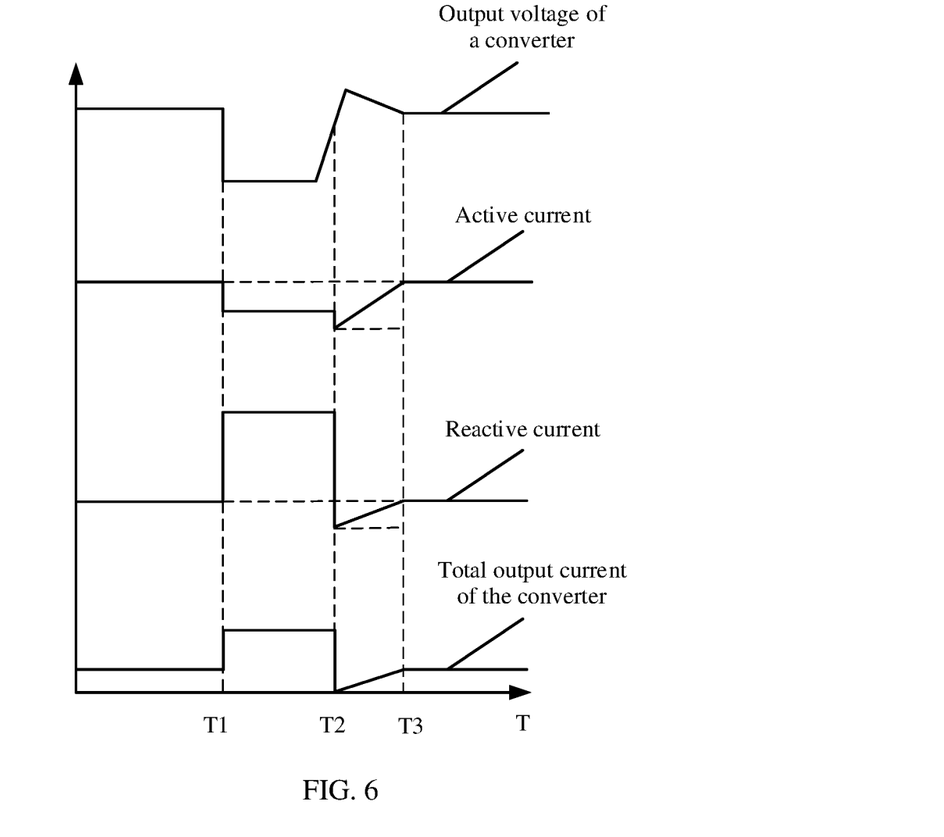
FIG. 6 is a schematic diagram of a waveform of an output voltage of a converter according to an embodiment.

With reference to FIG. 6, an example in which the controller 401 adjusts, based on a same current adjustment rate, the reactive current and the active current that are output by the converter is used below to describe a change process of the output voltage of the converter 402.

When the grid is faulty at a moment T1, an output voltage of the converter 402 drops to be below a first threshold, and low voltage ride through occurs in the converter 402. To support recovery of the grid, the controller converter 402 injects a reactive current into the grid. Therefore, a total output current of the converter 402 increases after the moment T1. When the grid is recovered from a fault, because an inductive impedance avoids a sudden change of a current and the converter 402 has a detection delay, voltage amplitudes at two terminals of the transmission impedance rise, and the output voltage of the converter 402 gradually rises. When it is detected at a moment T2 that the output voltage of the converter rises to a second threshold, an active current output by the converter 402 is controlled to be reduced to a first current value, and the reactive current output by the converter 402 is controlled to be reduced to a second current value. In this case, the total output current of the converter 402 is reduced. When the converter 402 whose current is adjusted outputs the output current to the grid, an amplitude of a total current on the transmission impedance decreases, and an amplitude of the output voltage of the converter 402 correspondingly decreases. Because the output current of the converter is less than a current value transmitted on the transmission impedance, the total output current of the converter accelerate a speed at which the current on the transmission impedance decreases, and the active current value and the reactive current value are adjusted based on a same current rate until the reactive current value is a target reactive current value and the active current is a target active current value. In this case, the output current of the converter 402 is recovered to a current range output when the converter 402 works normally, and the output voltage of the converter 402 is recovered to a voltage range output when the converter 402 works normally.

The converter 402 is a device configured to implement a grid connection of a new energy power generation system. An input terminal of the converter 402 is connected to the new energy power generation system, and an output terminal of the converter 402 is connected to the grid by using a grid-connected transformer. The converter 402 may convert a direct current output by the new energy power generation system into an alternating current, and output electric energy in an alternating current form to the grid by using the grid-connected transformer.

In this embodiment, the converter 402 configured to implement a grid connection of the new energy power generation system may be an isolated voltage conversion device or may be a non-isolated voltage conversion device. For example, an existing H-bridge drive circuit is used as the converter 402 to perform inversion processing on the direct current output by the new energy power generation system. In implementation, a structure of the converter 402 is not limited.

Figure 7:
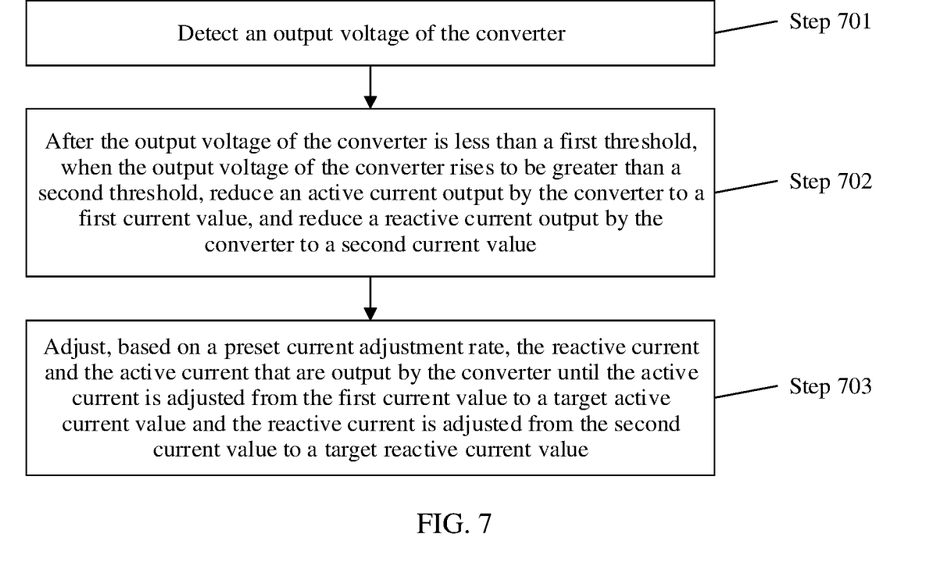
FIG. 7 is a schematic flowchart of a control method for a power conversion apparatus according to an embodiment.

An embodiment may further provide a control method for a power conversion apparatus. The method is applied to a power conversion apparatus. The power conversion apparatus may include a converter and a controller connected to the converter. The control method for a power conversion apparatus provided in this embodiment may be performed by the foregoing controller. As shown in FIG. 7, the method may include the following steps:

Step 701. Detect an output voltage of the converter.

Step 702. After the output voltage of the converter is less than a first threshold, when the output voltage of the converter rises to be greater than a second threshold, reduce an active current output by the converter to a first current value, and reduce a reactive current output by the converter to a second current value. The first threshold is less than the second threshold.

When it is determined that the output voltage of the converter is greater than or equal to a specified value, a drive signal of a switching transistor in the converter may be adjusted, so that the reactive current output by the converter is the first threshold, and the active current output by the converter is the second threshold.

Step 703. Adjust, based on a preset current adjustment rate, the reactive current and the active current that are output by the converter until the active current is adjusted from the first current value to a target active current value and the reactive current is adjusted from the second current value to a target reactive current value. The target reactive current value falls within a reactive current value range output when the converter works normally, the target active current value falls within an active current value range output when the converter works normally, and the first current value and the second current value are respectively any value less than 50% of the reactive current value range output when the converter works normally and any value less than 50% of the active current value range output when the converter works normally.

In a possible implementation, the first current value and the second current value are greater than 0 and less than or equal to 10% of an active current value and a reactive current value that are output when the converter works normally.

In a possible implementation, the adjusting, based on a preset current adjustment rate, the reactive current and the active current that are output by the converter until the active current is adjusted from the first current value to a target active current value and the reactive current is adjusted from the second current value to a target reactive current value includes: adjusting, based on different current adjustment rates, the reactive current or the active current output by the converter until the active current value is adjusted from the first current value to the target active current value and the reactive current is adjusted from the second current value to the target reactive current value.

In a possible implementation, the adjusting, based on different current adjustment rates, the reactive current or the active current output by the converter includes: adjusting, in a plurality of adjustment stages, the reactive current or the active current output by the converter, where current adjustment rates of all adjustment stages in the plurality of adjustment stages are different, or a current adjustment rate of at least one adjustment stage in the plurality of adjustment stages is different from a current adjustment rate of another adjustment stage, and the another adjustment stage is an adjustment stage other than the at least one adjustment stage in the plurality of adjustment stages.

In a possible implementation, the adjusting, based on a preset current adjustment rate, the reactive current and the active current that are output by the converter until the active current is adjusted from the first current value to a target active current value and the reactive current is adjusted from the second current value to a target reactive current value includes: adjusting, based on a same current adjustment rate, the reactive current or the active current output by the converter until the active current value is adjusted from the first current value to the target active current value and the reactive current is adjusted from the second current value to the target reactive current value.

In a possible implementation, when the output voltage of the converter is less than the first threshold, low voltage ride through occurs in the converter.

In a possible implementation, the second threshold is less than a minimum voltage output when the converter works normally.

For a structure of the power conversion apparatus and a process in which the controller adjusts an output current of the converter, refer to FIG. 4 to FIG. 6. Details are not described herein again.

The embodiments may be described with reference to the flowcharts and/or block diagrams of the method, the device (system), and the computer program product. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function in one or more processes in the flowcharts and/or in one or more blocks in the block diagrams.

The computer program instructions may alternatively be stored in a non-transitory computer-readable memory that can indicate a computer or another programmable data processing device to work according to the embodiments, so that the instructions stored in the non-transitory computer-readable memory generate an artifact that includes an instruction apparatus. The instruction apparatus implements a function in one or more procedures in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a function in one or more procedures in the flowcharts and/or in one or more blocks in the block diagrams.

It is clearly that, a person skilled in the art can make various modifications and variations without departing from the scope of the embodiments. The embodiments are intended to cover these modifications and variations and their equivalent technologies.

All or some of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. A power conversion apparatus, comprising:
a controller; and
a converter, wherein the controller is connected to the converter;
the controller is configured to detect an output voltage of the converter;
the controller is configured to: after the output voltage of the converter is less than a first threshold, when the output voltage of the converter rises to be greater than a second threshold, reduce an active current output by the converter to a first current value, and reduce a reactive current output by the converter to a second current value, wherein the second threshold is greater than the first threshold; and
adjust, based on a preset current adjustment rate, the reactive current and the active current that are output by the converter until the active current is adjusted from the first current value to a target active current value and the reactive current is adjusted from the second current value to a target reactive current value, wherein the target reactive current value falls within a reactive current range output when the converter works normally, the target active current value falls within an active current range output when the converter works normally, and the first current value and the second current value are respectively any value less than 50% of the reactive current value range output when the converter works normally and any value less than 50% of the active current value range output when the converter works normally.

2. The power conversion apparatus according to claim 1, wherein the first current value and the second current value are greater than 0 and less than or equal to 10% of an active current value and a reactive current value that are output when the converter works normally.

3. The power conversion apparatus according to claim 1, wherein the controller is further configured to:
adjust, based on different current adjustment rates, the reactive current or the active current that are output by the converter until the active current is adjusted from the first current value to a target active current value and the reactive current is adjusted from the second current value to a target reactive current value.

4. The power conversion apparatus according to claim 3, wherein the controller is further configured to:
adjust, in a plurality of adjustment stages, the reactive current or the active current output by the converter, wherein current adjustment rates of all adjustment stages in the plurality of adjustment stages are different, or a current adjustment rate of at least one adjustment stage in the plurality of adjustment stages is different from a current adjustment rate of another adjustment stage, and the another adjustment stage is an adjustment stage other than the at least one adjustment stage in the plurality of adjustment stages.

5. The power conversion apparatus according to claim 1, wherein the controller is further configured to:
adjust, based on a same current adjustment rate, the reactive current or the active current that are output by the converter until the active current is adjusted from the first current value to a target active current value and the reactive current is adjusted from the second current value to a target reactive current value.

6. The power conversion apparatus according to claim 1 wherein when the output voltage of the converter is less than the first threshold, low voltage ride through occurs in the converter.

7. The power conversion apparatus according to claim 1, wherein the second threshold is less than or equal to a minimum voltage value output when the converter works normally.

8. A control method for a power conversion apparatus, applied to a power conversion apparatus, wherein the power conversion apparatus comprises a controller and a converter; and the method comprises:
detecting an output voltage of the converter;
after the output voltage of the converter is less than a first threshold, when the output voltage of the converter rises to be greater than a second threshold, reducing an active current output by the converter to a first current value, and reducing a reactive current output by the converter to a second current value, wherein the second threshold is greater than the first threshold; and
adjusting, based on a preset current adjustment rate, the reactive current and the active current that are output by the converter until the active current is adjusted from the first current value to a target active current value and the reactive current is adjusted from the second current value to a target reactive current value, wherein the target reactive current value falls within a reactive current range output when the converter works normally, the target active current value falls within an active current range output when the converter works normally, and the first current value and the second current value are respectively any value less than 50% of the reactive current value range output when the converter works normally and any value less than 50% of the active current value range output when the converter works normally.

9. The control method according to claim 8, wherein the first current value and the second current value are greater than 0 and less than or equal to 10% of an active current value and a reactive current value that are output when the converter works normally.

10. The control method according to claim 8, wherein the adjusting, based on the preset current adjustment rate, the reactive current and the active current that are output by the converter until the active current is adjusted from the first current value to the target active current value and the reactive current is adjusted from the second current value to the target reactive current value further comprises:
adjusting, based on different current adjustment rates, the reactive current or the active current that are output by the converter until the active current is adjusted from the first current value to a target active current value and the reactive current is adjusted from the second current value to a target reactive current value.

11. The control method according to claim 10, wherein the adjusting, based on the different current adjustment rates, the reactive current or the active current that are output by the converter further comprises:
adjusting, in a plurality of adjustment stages, the reactive current or the active current output by the converter, wherein current adjustment rates of all adjustment stages in the plurality of adjustment stages are different, or a current adjustment rate of at least one adjustment stage in the plurality of adjustment stages is different from a current adjustment rate of another adjustment stage, and the another adjustment stage is an adjustment stage other than the at least one adjustment stage in the plurality of adjustment stages.

12. The control method according to claim 8, wherein the adjusting, based on the preset current adjustment rate, the reactive current and the active current that are output by the converter until the active current is adjusted from the first current value to the target active current value and the reactive current is adjusted from the second current value to the target reactive current value further comprises:
adjusting, based on a same current adjustment rate, the reactive current or the active current that are output by the converter until the active current is adjusted from the first current value to a target active current value and the reactive current is adjusted from the second current value to a target reactive current value.

13. The control method according to claim 8, wherein when the output voltage of the converter is less than the first threshold, low voltage ride through occurs in the converter.

14. The control method according to claim 8, wherein the second threshold is less than a minimum voltage output when the converter works normally.

* * * * *